Figure 6:
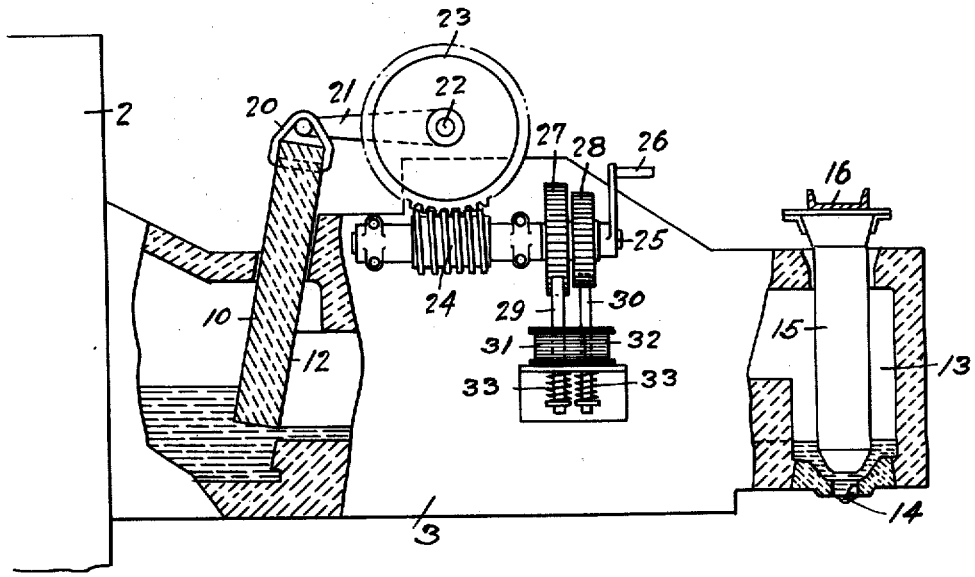

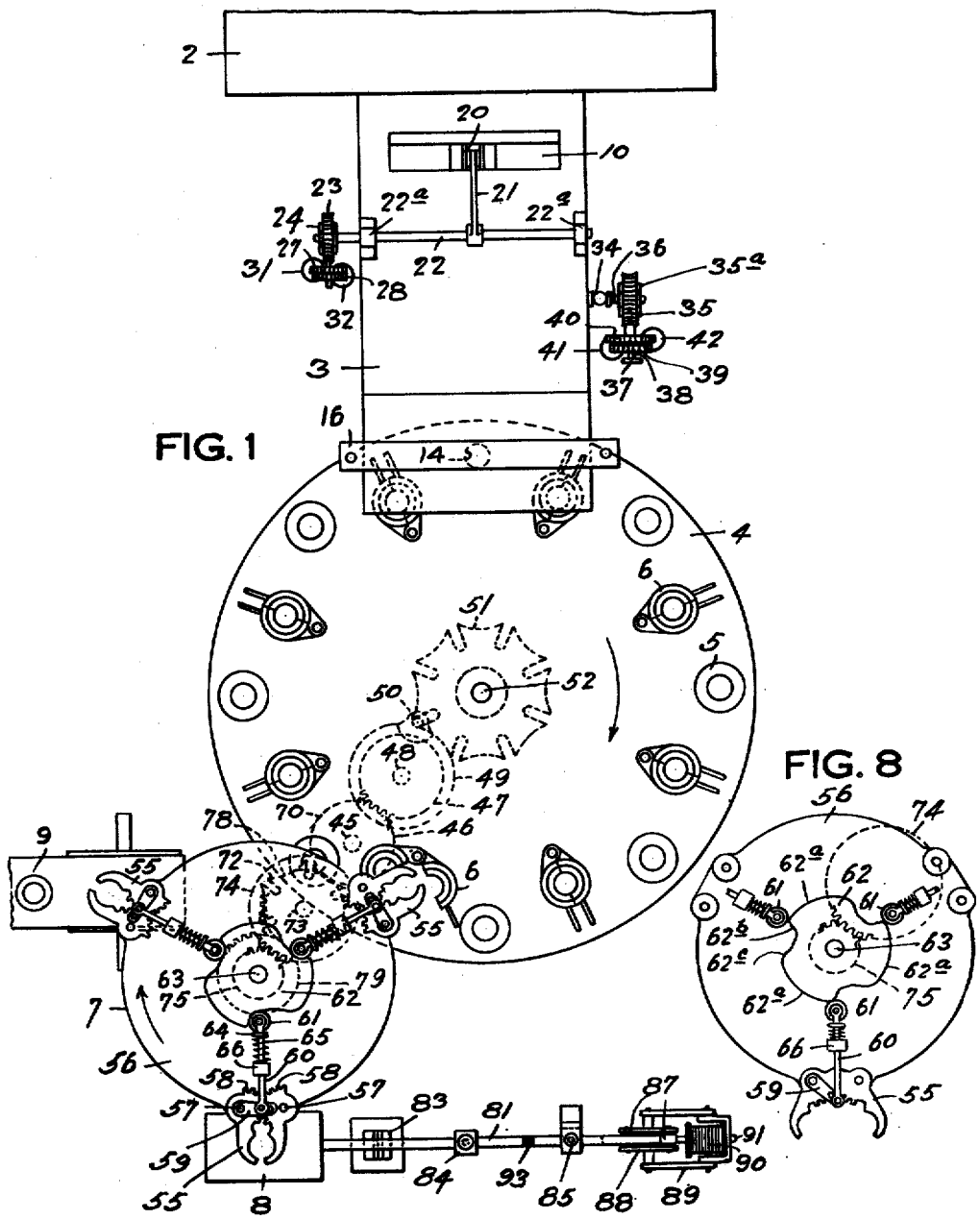

March 1, 1927.
G. E. HOWARD
1,619,729
REGULATION OF GLASS FEEDERS
Filed June 9, 1923    3 Sheets-Sheet 2
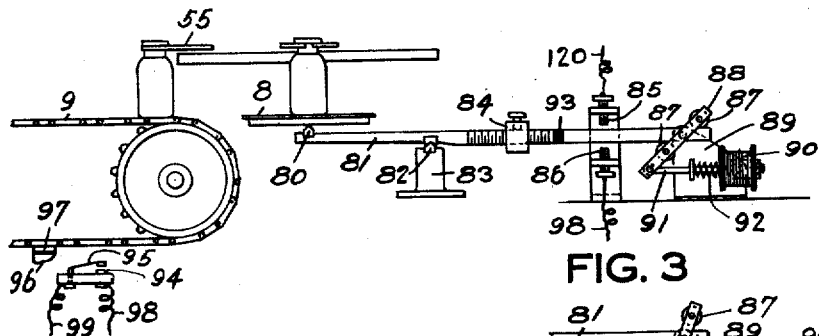
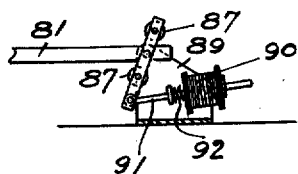
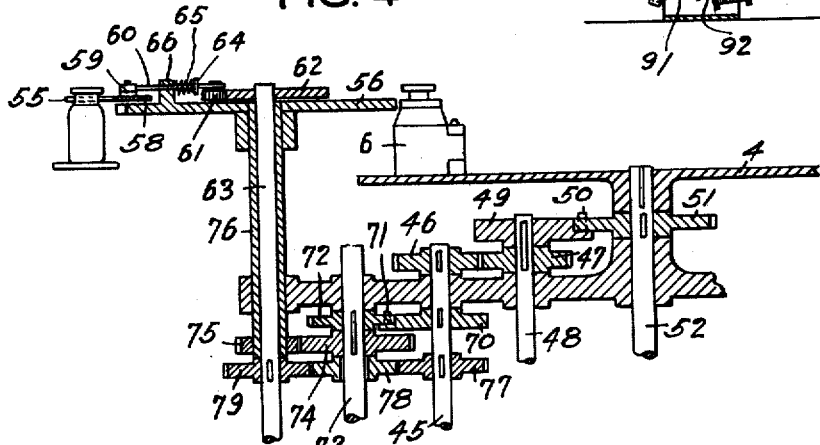
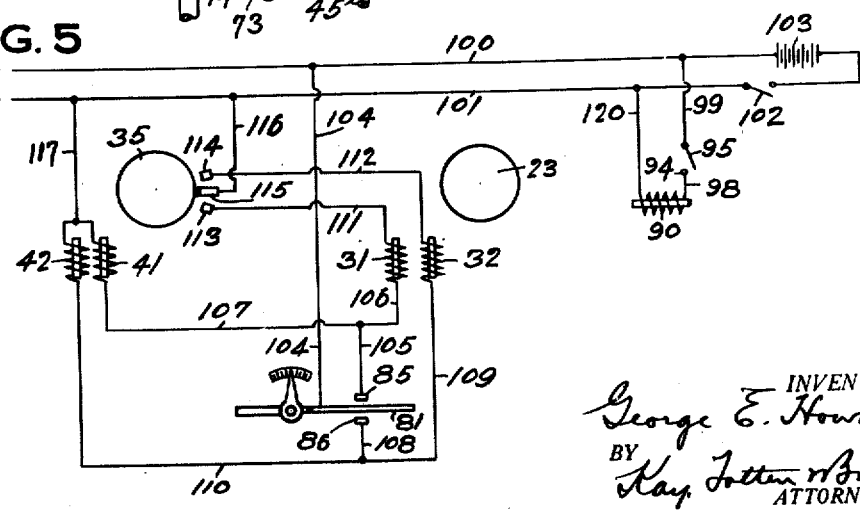

March 1, 1927.

G. E. HOWARD 1,619,729

REGULATION OF GLASS FEEDERS

Filed June 9, 1923    3 Sheets-Sheet 3

INVENTOR.
George E. Howard
BY
Kay, Totten & Brown
ATTORNEYS.

Patented Mar. 1, 1927.

1,619,729

UNITED STATES PATENT OFFICE.

GEORGE E. HOWARD, OF BUTLER, PENNSYLVANIA.

REGULATION OF GLASS FEEDERS.

Application filed June 9, 1923. Serial No. 644,391.

My invention relates to the manufacture of glassware by the use of automatic glass-feeding and ware-forming machinery, and its general object is to improve the regulation of glass feeders during the running operation, for the purpose of producing mold charges of substantially uniform weight.

More specifically, one object of my invention is to provide a method of keeping constant, within predetermined limits, the weight of the mold charges delivered by a glass feeder, by periodically weighing one of the bottles or other glass articles produced from the mold charges, and causing the weight of the periodically selected articles to automatically increase or decrease the rate at which the molten glass is delivered by the feeder if such articles are substantially below or above the normal limits of weight.

Another object of my invention is to provide a system of electric control, operated by a weighing scale, for causing glass articles of abnormal weight to actuate the regulating mechanism of a glass feeder.

A further object of my invention is to provide automatic means for weighing periodically-selected glass articles produced by a forming machines without disturbing the normal progress of the ware from the machine to the annealing lehr.

Modern machienry for manufacturing glass bottles, tumblers, and other articles of glassware includes a forming machine having molds into which individual charges of molten glass are delivered by an automatic glass feeder which receives its supply of molten glass from a continuous tank furnace. On account of the peculiar nature of molten glass, and the sensitive manner in which it changes its fluidity in response to relatively slight temperature changes, it has always been a matter of difficulty to insure that all of the mold charges delivered to a given set of molds shall be of precisely the same weight. Also, molten glass, like other liquids, flows through a discharge orifice at a rate which depends upon the depth or head of glass above the discharge orifice. In the commercial operation of a tank furnace, variations in the level of the glass occur to a greater or less extent because the batch is usually charged into the furnace in relatively short periods of time separated by relatively long intervals. Therefore, the level of the glass is suddenly raised at each charging period and then lowers gradually as the glass is worked out through the feeder in the longer periods between batch-charges.

When a glass feeder is driven by an electric motor, the weight of the mold charges delivered by the feeder is also affected by fluctuations in the voltage impressed on the motor. These voltage changes produce corresponding changes in the speed of the motor and consequently in the frequency of the feeder operations, and this causes the feeder to deliver mold charges of improper weight. Sometimes the voltage fluctuations are temporary, and at other times the voltage may change gradually in long swings of increase and decrease.

Any material change in the weight of the gathers delivered by a glass feeder produces a non-uniform product which, for that reason, is less saleable than a product in which the individual units are of substantially the same weight. One practice for controlling the weight of the mold charges is to use auxiliary heating flames and cooling blasts which are adjusted when necessary to correct the temperature of the glass. In feeders where the glass is delivered to the discharge orifice by mechanical impelling means, it has been the practice to regulate the weight of the mold charges by changing the operation of the impelling means. Other means which have been employed to the same end involve the maintenance of a uniform height or level of glass above the discharge orifice.

All of the prior methods of regulating glass feeders which depend upon changing the temperature of the glass or the manner in which it is delivered to the discharge orifice require some sort of manual operation on the part of a workman, who must turn a valve or perform some other operation in order to increase or decrease the heating flames, to increase or decrease the speed of the impelling mechanism, or to make some other change. In order to observe the operation of the machine and determine whether or not the glass is being delivered at a uniform rate, it is customary to weigh one of the glass articles taken from time to time from the series delivered by the shaping machine. If the weight is greater or less than the standard limits of weight for that article, the necessary manual correction is then made, according to the nature of the apparatus employed.

If a workman gives his whole attention to this work of regulating a glass feeder according to the weight of the articles delivered, the weight of the ware may be kept within fairly close limits, but this is seldom done in actual practice, and the duty of looking after the weighing of the test-articles and the regulation of the feeder is usually attended to by a workman who has had other duties to perform, so that the weighing of the test-articles is frequently neglected until the weight of the mold charges has become much greater or much less than the standard.

According to my present invention I provide for regulating the weight of the mold charges delivered by a glass feeder, in automatic response to the weight of glass articles produced from such mold charges. I accomplish this result, in general, by providing mechanism for periodically weighing certain of the bottles or other articles after they are delivered from the shaping machine, and by providing other mechanism which automatically operates, if the article should be abnormally light or heavy, to increase or decrease the weight of the delivered mold charges. A certain amount of variation from the standard weight is always permissible, and the apparatus is therefore so arranged as to change the regulation of the feeder only when the permissible variation from the standard weight is exceeded.

The weighing and regulating mechanism is arranged to weigh periodically selected articles, which may, for example be every fifth, tenth, twentieth or fiftieth article. All of the articles delivered from the machine may be placed upon the weighing scale before being carried to the lehr, in which case the scale is provided with beam-locking means which are released whenever the article to be weighed is brought to the scale, and which keep the scale from operating to weigh the other articles. Or, if desired, only the selected articles may be placed upon the scale, in which case the locking means are released each time that a test article is placed on the scale pan. In either of these cases, if the scale is depressed either too little or too much by reason of the improper weight of the article, such abnormal position of the scale is caused to change the operation of the glass feeder, this being suitably accomplished by means of a system of electric contacts and magnets which may be arranged in the manner described below, or in an equivalent manner. After being weighed, the test articles may be moved towards the lehr in their original places, and therefore the general operation of the plant need not be changed in any way.

In modern glass feeders it is customary to provide two or more separate means for increasing and decreasing the amount of glass which issues from the feeder outlet. In one commercial feeder, such control is effected by the use of gas flames and also by the use of a valve which controls the flow of glass from the tank furnace into the feeder. The gas flames control the amount of issuing glass by changing its temperature, and consequently its fluidity, while the glass valve regulates the effective area of the channel through which the glass flows.

In another commercial feeder an impeller or paddle is employed for advancing portions of glass from the tank forehearth to a feeding receptacle, and gas flames are also employed for regulating the fluidity of the glass. In still another commercial feeder the effective area of the channel through which the glass flows to the feeder outlet is regulated by adjustment of a sleeve surrounding a needle or plunger which is mounted to reciprocate vertically above the outlet and, in this feeder also, gas flames are utilized for controlling the temperature and consistency of the glass.

My invention may be applied to all such constructions in such a way as to automatically operate the several control mechanisms, either simultaneously or in succession. I prefer that this dual or multiple control be carried out in a progressive manner. Thus, when gas flames and a glass valve are employed as the control means, slight variations of the finished ware below normal weight may be caused to actuate the valves of the gas burners without at first affecting the position of the glass-valve. If successive increases in the gas flames are not sufficient to restore the proper weight of the ware, the regulation is automatically transferred from the gas burners to the glass valve, and the glass valve is then slightly opened as each abnormally light article actuates the weighing mechanism. Thereafter, when the weight of the ware becomes greater than the normal maximum weight, the fuel valve is operated in the reverse manner to reduce the heat applied to the glass. If this adjustment is not sufficient to produce ware of normal weight, the regulation is again transferred to the glass valve, which is then slightly closed as each abnormally heavy test-article is weighed.

Figure 7:
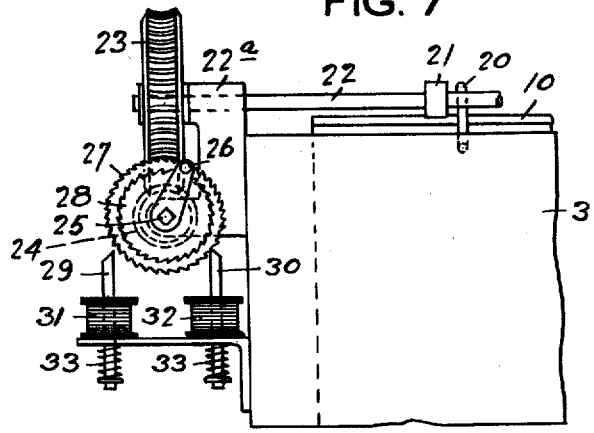

A system of this kind has been selected for illustrating my invention, and is shown in the accompanying drawing in which Fig. 1 is a plan view showing somewhat diagrammatically a glass feeder and a forming machine provided with a system of automatic control arranged according to my present invention; Fig. 2 is a side elevational view of the weighing scale shown in Fig. 1; Fig. 3 is a fragmentary side elevational view showing the scale-locking device in its open position; Fig. 4 is a vertical sectional view through the take-out device and a portion of the mold table, the section being taken substantially on the line 4—4, Fig. 1; Fig. 5 is a wiring diagram showing a system of electric connections that may be employed in carrying out my invention; Fig. 6 is a side view, partly in elevation and partly in section, showing adjusting mechanism for raising and lowering the cutoff gate or glass valve of the feeder, Fig. 7 is an end view of the same construction, as seen from the right of Fig. 6, and Fig. 8 is a plan view of the tong-table showing the tongs in their open position.

It will be understood that the principles of my invention may be applied to the regulation of the other feeder mechanisms mentioned above, and to any feeding apparatus where the flow of glass may be regulated by mechanical means.

In Fig. 1 of the drawing, the numeral 2 indicates a portion of a tank furnace having an extension or forehearth 3, the outer end of which projects over a mold-table 4 upon which are a series of blank-molds 5 and a corresponding series of blow-molds 6. A take-out device, indicated generally by the numeral 7, operates to transfer the finished ware from the blow-molds to a scale pan 8 and thence to an endless conveyor or buck 9. The feeder and the forming machine are shown somewhat diagrammatically and with the blow-heads and blank-transferring apparatus omitted in order that the illustration of the regulating apparatus may not be confused by showing ordinary structure which does not relate to my invention.

A valve member or gate 10, which may consist of a slab of clay or other refractory material, controls the flow of glass from the tank furnace 2 to the forehearth 3. As best shown in Fig. 6, this valve member rests flat upon an inclined seat 12 which defines an opening through which the glass may flow into the forehearth.

At the outer end of the forehearth 3 is a feeding chamber 13 having a downwardly opening discharge outlet 14, above which is a vertical plunger 15 mounted on a bar 16, which is arranged to be reciprocated vertically by well known means.

The movable valve member 10 may be suspended by means of a stirrup 20 from the outer end of an arm 21, the opposite end of which is secured to a horizontal shaft 22 mounted in bearings 22ª on the top of the forehearth 3.

Secured to the shaft 22 is worm wheel 23 meshing with a worm 24 on a horizontal shaft 25 which carries at its outer end a handle 26 by means of which the shaft 25 may be turned manually to the right or left in order to turn the shaft 22, and thus raise or lower the movable valve member 10.

The shaft 25 also carries two ratchet wheels 27 and 28 having their teeth extending in opposite directions. These ratchet wheels may be of the same size, but for convenient illustration the ratchet 28 has been shown smaller than the ratchet 27. A pawl 29 is arranged to engage the teeth of the ratchet 27, and another pawl 30 is arranged to engage the teeth of the ratchet 28. These pawls are carried by the movable core members of two electro-magnets 31 and 32 respectively, and springs 33 are provided to retract the pawls 29 and 30 to the inoperative position shown in Fig. 7 when the magnets 31 and 32 are de-energized. When the winding of the magnet 31 is energized, it raises the pawl 29 which engages a tooth of the ratchet wheel 27 and slightly turns the shaft 25 in a clockwise direction, as shown in Fig. 7, this movement being communicated through the worm 24, the worm wheel 23, the shaft 22 and the arm 21 to lower slightly the valve member 10. If, on the other hand, the winding of the magnet 32 is energized, it raises the pawl 30 and causes this pawl to rotate the ratchet wheel 28 slightly in a counter-clockwise direction, Fig. 7, this movement being communicated by the same train of connections to the valve member 10 which is thereby slightly raised. The windings of the magnets 31 and 32 are energized in response to abnormal weights of articles weighed on the scale pan 8, and circuit connections for this purpose will be described below.

Between the glass valve 10 and the discharge chamber 13, one or more gas or oil burners are provided for heating the interior of the forehearth 3. The valve of one of these burners is indicated at 34, Fig. 1, and is provided with a stem 36 to which is secured a worm wheel 35 similar to the worm wheel 23 described above in connection with the glass valve 10. The worm wheel 35 is provided with a driving worm 35ª similar to the worm 24, and a hand wheel 37 is secured to the shaft 38 of the worm 35ª for manually adjusting the valve 34. The worm wheel 35 is also provided with a pawl and ratchet mechanism which is similar to that described above and which includes ratchet discs 39 and 40 that are operated by means of pawls actuated by electro-magnets 41 and 42, respectively. The magnet 41 may operate to close the fuel valve 34 by successive small increments, while the magnet 42 may similarly open the valve 34.

Power connections for rotating the mold-table 4 are shown in Figs. 1 and 4 and include a drive shaft 45 which is connected to a suitable source of power, not shown, and which carries a spur gear 46 meshing with a spur gear 47 on a countershaft 48 which carries a disc 49. The disc 49 carries a pin 50 engaging a star-wheel 51 that is secured to a vertical shaft 52, the upper end of which is secured to the mold-table 4. The star-wheel 51 is provided with a number of teeth corresponding to the number of pairs of molds on the mold table. As shown, the mold-table 4 carries eight such pairs of molds and the star-wheel 51 has eight teeth, so that the mold-table 4 is advanced one-eighth of a revolution during each complete revolution of the disc 49.

The take-out mechanism 7 includes three pairs of tongs 55 which are mounted on an intermittently rotatable table 56 and are provided with cam-operated means for opening and closing each pair of tongs at the take-out position, at the scale position, and at the position where the ware is deposited upon the buck 9. The tongs 55 are pivotally mounted on pins 57 carried by the table 56 and are provided with toothed segments 58 which mesh with each other so as to cause the jaws of each pair of tongs to open and close together when one of these jaws is rocked upon its pivot pin 57. One of these pivot pins carries a short crank 59, the end of which is pivotally connected to a rod 60 carrying a cam roller 61 which runs upon the periphery of a cam 62 which is frictionally secured to the upper end of a vertical shaft 63 just above the table 56. The rod 60 carries a collar 64, and a spring 65 surrounds the rod 60 between the collar 64 and a fixed abutment 66 carried by the table 56. This spring tends to hold the tongs in the closed position shown in Fig. 1 until the cam 62 operates through the rod 60 and the crank 59 to move the tongs to the open position shown in Fig. 8.

It will be seen that the cam 62 which operates the tongs has three similar and circularly curved dwell portions 62ª separated by radial surfaces 62ᵇ and by inclined surfaces 62ᶜ, so that, at each of the three positions of these tongs they are simultaneously opened by means of the inclined cam-surfaces 62ᶜ, held open by the dwell surfaces 62ª, and then closed rapidly when the rollers 61 reach the radial surfaces 62ᵇ. The cam 62 is rotated in a clockwise direction, Figs. 1 and 8, while the tong-table 56 is moved intermittently in the same direction and in timed relation with the mold-table 4 so that during each interval when the mold-table is at rest, the tong-table 56 turns through one-third of a revolution. The cam 62 is so adjusted as to open the tongs after this movement is completed, and then to close the tongs after the next movement of the mold-table brings a new glass article to the take-out position, whereupon the tong-table is turned one-third of a revolution and the tongs are again opened. The frictional engagement between the cam 62 and its driving shaft 63 permits the cam 62 to be carried around with the tong-table 56 during each intermittent movement of the tong-table, this movement of the cam 62 being produced by the rollers 61 which, at this time, are in engagement with the radial surfaces 62ᵇ of the cam 62 as shown in Fig. 1. In the intervals between these movements of the tong-table 56, the cam 62 is rotated by the shaft 63.

A disc 70 is secured to the drive shaft 45 and carries a pin 71 engaging a star-wheel 72 which is secured to a vertical countershaft 73 to which is secured a spur gear 74 meshing with a smaller spur gear 75 which is secured to a sleeve 76, the upper end of which is attached to the center of the tong-table 56. The star-wheel 72 is shown as having six teeth and the gear 75 is one-half as large as the gear 74. Therefore, when the star-wheel 72 is turned one step the gear 75 is turned through one-third of a revolution.

The shaft 63 which carries the cam 62 is continuously rotated from the power shaft 45 through a spur gear 77 carried by the shaft 45 and meshing with an idle gear 78 which is mounted loosely on the countershaft 73 and meshes with a gear 79 secured to the shaft 63.

The weighing scale which includes the scale pan 8 may be of any desired construction. As shown, the scale-pan 8 is supported on knife edges 80 carried by a beam 81 which is supported on knife edges 82 carried by a fixed support 83. The beam 81 on the side of the support 83 opposite to the scale pan 8 is graduated and is provided with a sliding weight 84 and beyond the weight 84 the beam 81 extends between adjustable electric contact members 85 and 86, and also between the rollers 87 of a beam-locking device. This locking device may consist of side members 88 which carry the rollers 87 and which are pivotally mounted on a support 89. An electro-magnet 90 is also pivotally mounted on the support 89 and its core 91 is pivotally secured to the side members 88 near their lower ends. A spring 92 surrounds the core 91 and tends to hold the locking device in the position shown in Fig. 2, where the scale-beam 81 is held against vertical movement. When the electro-magnet 90 is energized, the locking device is moved to the position shown in Fig. 3, where the scale beam 81 is free to move vertically to a degree which is limited by the adjusted position of the contact members 85 and 86. These contact members are so arranged that after a bottle or other glass article within the normal limit of weight is placed upon the scale pan 8 and the beam-locking device is then released, the beam 81 will not touch either the contact member 85 or the contact member 86, but if the bottle or other article is substantially heavier than the maximum permissible weight it will depress the scale pan 8 sufficiently to raise the beam 81 into engagement with the upper contact member 85. If the article should be lighter than the minimum permissible weight, the beam 81 will descend into engagement with the lower contact member 86. These electric contacts are utilized to operate the electro-magnets controlling the fuel valve 34 and the glass valve 10 through the system of electric connections shown in Fig. 5.

The portion of the scale beam 81 which carries electric current and cooperates with the contact members 85 and 86 may be insulated from the remainder of the scale beam by means of a section 93 of insulating material, or separate electric contact members may be attached to the scale beam 81 and in proper position to engage the contact members 85 and 86, in which case such separate contact members are insulated from the scale beam 81 and are electrically connected together.

The electric circuit which includes the winding of the beam-releasing magnet 90 is provided with a switch which is so arranged as to be closed automatically at any desired intervals, so as to release the scale beam and permit one of the glass articles to be weighed periodically. For example, this switch may be located adjacent to the buck 9 and the buck may be provided with one or more switch-closing members which operate to close the switch once during each complete cycle of the buck. Such an arrangement is shown in Fig. 2 of the drawing, wherein a switch consisting of a fixed contact member 94 and a movable spring-contact 95 is arranged in the path of movement of a member 96 which is carried by a link of one of the endless chains of the buck and is electrically insulated from the chain by means of insulation indicated at 97. When this circuit-closing arrangement is employed, the movement of the buck 9 must of course be so timed, with relation to the movements of the mold-table and of the take-out tongs, that the circuit is closed to release the scale beam after the glass article to be weighed is placed upon the scale pan 8.

Conductors 98 and 99 are connected to the switch contacts 94 and 95, respectively, the conductor 98 being connected to one terminal of the magnet 90 while the conductor 99 is connected to a main line conductor 100. The magnet winding 90 is also connected to the other line conductor 101, so that the circuit through the releasing magnet 90 is completed whenever the switch contact 95 is depressed into engagement with the contact 94.

The electric control system shown in the wiring diagram of Fig. 5 includes the main line conductors 100 and 101 provided with a switch 102 and energized from a battery 103 or other source of electric energy. The conducting portion of the scale beam 81 is connected to the line conductor 100 by means of a conductor 104. The upper contact member 85 is connected to both of the electro-magnets 31 and 41 by means of conductors 105, 106 and 107, while the lower contact member 86 is connected to both of the electro-magnets 32 and 42 by means of conductors 109 and 110.

The electro-magnets 31 and 32 belonging to the glass valve regulator are connected by means of conductors 111 and 112, respectively, to fixed contact members 113 and 114 which are located in the path of movement of a contact member 115 which is carried by the fuel-controlling worm wheel 35 and is insulated therefrom. The contact member 115 is connected by means of a conductor 116 to the main line conductor 101.

The remaining terminals of the electro-magnets 41 and 42 which control the fuel valve regulator are both connected to a conductor 117 which is in turn connected to the main line conductor 101. The winding of the releasing magnet 90 is connected across the main line conductors 100 and 101 by means of the conductors 98 and 99 and a conductor 120.

When the glass feeder and the shaping machine are to be started, the electric control system is thrown out of operation by opening the main line switch 102 and is left idle until the feeder is operating properly. This proper operating condition requires correct adjustment of the fuel valves 34 and of the gate 10, and this is done by means of the manual control handles 26 and 37 without affecting the automatic regulating mechanism. While the apparatus is being started, the sliding weight 84 and the contacts 85 and 86 should be adjusted in accordance with the weight of the ware to be made, so that the scale beam 81 will not touch either of the contacts while weighing an article which is of normal weight, or which is within the permissable limits of variation from the normal weight.

When these arrangements have been made and the apparatus is functioning properly, the main line switch 102 is closed. The feeder deposits mold-charges of glass in the blank-molds 5 sucessively as the mold-table is rotated step by step to bring these molds beneath the feeder outlet 14. The blanks made in the blank-molds 5 are transferred to the blow-mold 6 by ordinary transfer mechanism, not shown, and the articles are blown up in the blow-molds by means of the usual blowing apparatus.

When each blow-mold reaches the take-out position, the mold opens and the take-out tongs which have just previously reached the take-out position and have been opened, are caused to close upon the neck of the bottle or jar through the movement of the cam 62 which at this moment releases the rod 60 and permits the spring 65 to close the tongs. The star-wheel 72 is then partially rotated by means of the pin 71 and this movement is communicated, through the shaft 73 and the gears 74 and 75, to the sleeve 76 which is turned through one-third of a revolution in a clock-wise direction, Fig. 1, thus bringing the bottle or jar above the scale pan 8. The tongs are then opened by means of the inclined surfaces 62$^c$ of the cam 62 and the article is allowed to rest upon the scale pan. If the article is to be weighed in order to actuate the regulating system, the scale-locking device is automatically released for this purpose. Most of the articles, however, may rest upon the scale pan without being weighed and are then transferred, on the next partial rotation of the tongs, to a position above the buck 9. The tongs are then opened and the bottle is received upon the buck which advances in a step by step manner to convey the bottles away from the machine.

At any desired intervals the circuit closer, such as the member 96 carried by the buck, closes the circuit through the releasing magnet 90 thereby releasing the beam-locking device and leaving the scale free to weigh the article which has been deposited upon it. If such bottle is within the permissible limits of weight, the scale beam 81 remains between the contacts 85 and 86 without touching either of them, and when the circuit closer 96 passes beyond the switch member 95 the circuit through the winding of the magnet 90 is opened and the scale-beam is again locked without any operation of the feeder controls.

If, however, the bottle which is weighed is heavier than the permissible maximum weight, it will depress the scale pan 8 and raise the conducting portion of the beam 81 into contact with the upper contact member 85. Current will then flow from the line conductor 100 through the conductor 104 to the scale beam, thence through contact member 85 and conductors 105 and 107 to the magnet winding 41, and thence through conductor 117 to the line conductor 101. When the magnet winding 41 is thus energized, the pawl carried by the core of this magnet engages the ratchet wheel 39 and turns this ratchet wheel through the space of one tooth. This movement is communicated through the worm 35$^a$, and the worm wheel 35 to the valve 34 thereby slightly closing this valve. This reduces the temperature within the feeder and tends to make the flowing glass somewhat cooler, with the result that, when the cooler glass reaches the feeder outlet, less glass is delivered by each stroke of the feeder, and consequently the mold charges are brought nearer to their normal weight. The effect of one of these movements is preferably very slight, and if the weight of the ware is very abnormal, a number of such movements will occur successively as each test article is weighed.

If the test article is lighter than the permissible minimum, a similar action takes place in the reverse direction, the conducting portion of the scale-beam 81 being brought into contact with the lower fixed contact member 86 and the circuit being then completed through conductor 104, scale beam 81, conductors 108 and 110, magnet-winding 42 and conductor 117. When the magnet-winding 42 is thus energized, it causes the pawl carried by its core to rotate the ratchet wheel 40 through the space of one tooth. This causes the valve 34 to be slightly opened, thereby increasing the heat within the feeder and rendering the glass more fluid, which permits a greater quantity of glass to be delivered at each stroke of the feeder.

If it should happen that the apparatus is making glass articles which exceed the normal weight so greatly that manipulation of the fuel valves is not sufficient to restore the proper weight, the regulation is transferred from the fuel valves to the glass gate 10 and this gate is lowered to restrict the opening through which the glass enters the feeder. This transfer is effected by means of the contact member 115 carried by the worm wheel 35 of the fuel regulator. When this worm wheel 35 is repeatedly turned in the same direction in response to abnormally heavy glass articles, the contact member 115 is brought into engagement with the fixed contact member 113. This has the double effect of preventing the fuel regulator from further operation in that direction, and of also connecting the magnet winding 31 of the gate regulator to the line conductor 101. When the next abnormally heavy bottle is weighed and the scale-beam 81 rises into engagement with the fixed contact member, current will flow as before through the magnet winding 41, and this magnet will endeavor to again move the worm wheel 40 to close the fuel valves, such movement, however, being prevented by the engagement of the contact member 115 with the contact member 113. At the same time, current flows through the conductor 106, magnet-winding 31, conductor 111, contact members 113 and 115 and conductors 116.

When the magnet winding 32 is thus energized, its pawl 29 rises and advances the ratchet wheel 27 through the space of one tooth, thereby turning the shaft 25 and the worm 24 in a clockwise direction, Fig. 7, rotating the worm wheel 23 in a counter-clockwise direction, Fig. 6, and slightly lowering the gate 10. This action is repeated as long as abnormally heavy articles are weighed.

If the glass articles should be very much lighter than the permissible minimum weight, the same operation takes place in the reverse direction, the contact member 115 of the fuel-regulating, worm wheel 35 being brought into engagement with the fixed contact member 114, and the subsequent regulations being then produced by the magnet-winding 32 of the gate regulator. When, in either of these cases, the weight of the glass articles is brought back to normal and then passes beyond the normal limit of weight, the regulation is transferred back to the fuel valves, the contact member 115 being moved away from the fixed contact member 113 or 114 and thereby stopping the operation of the gate regulator, which remains idle unless and until the subsequent fuel regulations are not sufficient to maintain the weight of the ware within the limits of control which can be produced by the fuel regulator.

By means of the automatic arrangements herein disclosed, the weight of the ware produced by any given installation may be kept so nearly constant that practically no articles need be discarded on account of abnormal weight after the apparatus is once set in normal operation.

It will be noted that a substantial time interval necessarily exists between the weighing of an abnormal bottle and the time when the correction appears in the weight of the mold-charges, because some time is required for the glass to flow from the point of control to the feeder outlet, and time is also required for an increase or decrease in the fuel supply to manifest itself in the temperature and consistency of the glass. My present system differs in this respect from other weight-controlled apparatus which act to control the weight of masses of material by weighing the masses whose weight is to be controlled, as in automatic packing machines and the like. In my present system the weight of a given glass article is taken, not for the purpose of correcting the weight of that particular article, which is of course not possible, but for the purpose of correcting the weight of other articles to be produced later.

The method of selecting and weighing periodical articles for the purpose of controlling the feeder may be varied by placing the scale at one side of the path traversed by the bottles or other articles after they leave the forming machine, deflecting one of the articles at stated intervals from its normal path to the scale, weighing the article, and then returning the articles to its original place in the series. This deflection may be done by means of automatic flection or the like, or the articles tongs, pushers or the like, or the articles may be manually transferred to and from the scale if it is desired to simplify the construction of the system.

It will be observed that this regulating system does not affect in any way the normal cycle of the delivery mechanism of the feeder, and that when the regulator operate, the plunger, paddle or needle continues to make the stroke for which it is normally adjusted.

It should again be noted that my invention is not restricted in any way to the precise construction herein shown and described, and that my invention may be carried out in any manner and with any means within the scope of the appended claims.

I claim as my invention:

1. The method of regulating the weight of mold-charges delivered by a glass feeder that comprises periodically weighing one of the articles formed from mold-charges delivered by said feeder, and varying the rate at which glass is delivered by said feeder in automatic response to substantial variation of said article from the normal weight of said articles.

2. The method of regulating the weight of mold-charges delivered by a glass feeder that comprises periodically weighing one of the articles formed from mold-charges delivered by said feeder, and varying the rate at which glass is delivered by said feeder in automatic response to variation of said article from a predetermined range of weight.

3. The method of regulating the weight of mold-charges delivered by a glass feeder that comprises periodically weighing one of the articles formed from mold-charges delivered by said feeder, and automatically increasing the rate at which glass is delivered by said feeder of the said article is lighter than a pre-determined minimum weight, or automatically decreasing the rate at which glass is delivered by the feeder if the said article is heavier than a predetermined maximum weight.

4. The method of regulating the weight of mold-charges delivered by a glass feeder that comprises periodically weighing one of the articles formed from mold charges delivered by said feeder, and automatically increasing the heat applied to the glass before its discharge from said feeder of said article is lighter than a predetermined minimum weight, or automatically decreasing the heat applied to the glass before discharge from said feeder if said article is heavier than a predetermined maximum weight.

5. The method of regulating the weight of mold-charges delivered by a glass feeder that comprises periodically weighing one of the articles formed from mold-charges delivered by said feeder, and automatically increasing the effective size of the channel through which glass flows to the feeder outlet if the said article is lighter than a predetermined weight, or decreasing the effective size of said channel if said article is heavier than a predetermined maximum weight.

6. The method of regulating the weight of mold-charges delivered by a glass feeder that comprises periodically weighing one of the articles formed from mold-charges delivered by said feeder, automatically increasing the rate at which glass is delivered by said feeder if the said article is lighter than a predetermined minimum weight, and continuing said increase in successive increments in response to the abnormally light weight of periodically weighed test-articles, until the weight of the test-articles exceeds the said predetermined minimum.

7. The method of regulating the weight of mold-charges delivered by a glass feeder that comprises periodically weighing one of the articles formed from mold charges delivered by said feeder, automatically decreasing the rate at which glass is delivered by the feeder if said article is heavier than a predetermined maximum weight, and continuing such decrease in successive increments in response to the abnormally heavy weight of periodically selected articles until the weight of the test-articles falls below the said predetermined maximum.

8. The method of regulating the weight of mold charges delivered by a glass feeder that comprises periodically weighing one of the articles formed from mold-charges delivered by said feeder, automatically increasing in successive increments the heat applied to the glass before discharge from said feeder if said test-articles are lighter than a predetermined minimum weight, and thereafter increasing the effective size of the channel through which the glass flows to the feeder outlet if the said successive increases in the heat applied to the glass are not sufficient to restore the mold-charges to normal weight.

9. The method of regulating the weight of mold-charges delivered by a glass feeder that comprises periodically weighing one of the articles formed from mold-charges delivered by said feeder, automatically decreasing the heat applied to the glass before discharge from said feeder if said article is heavier than a predetermined maximum weight, continuing said decrease of heat, in successive increments, in automatic response to the weight of abnormally heavy test-articles, and thereafter decreasing the effective size of the channel through which the glass flows to the feeder outlet if the said successive decreases in heat are not sufficient to restore the mold-charges delivered by said feeder to normal weight.

10. Apparatus for regulating a glass feeder comprising a weighing scale and means controlled by said scale for varying the rate of delivery of glass by said feeder.

11. Apparatus for regulating a glass feeder comprising a weighing scale and electrically operable means, controlled by said scale, for varying the rate of delivery of glass by said feeder.

12. Apparatus for regulating a glass feeder comprising a weighing scale, and means controlled by said scale for varying the rate at which glass is delivered by said feeder in automatic response to variations in weight, above a predetermined maximum weight or below a predetermined minimum weight, of articles formed from mold-charges delivered by said feeder.

13. Apparatus for making glassware comprising a glass feeder, a ware-shaping machine, means for taking ware from said machine, a weighing scale, automatically operable means for causing said scale to periodically weigh an article taken from said machine, and means for varying the rate at which glass is delivered by said feeder in automatic response to variations in the weight of said articles above a predetermined maximum weight, or below a predetermined minimum weight.

14. Apparatus for regulating a glass feeder comprising a weighing scale and adjustable means, operable in response to movement of said scale for changing the rate at which glass is delivered by said feeder.

15. Apparatus for regulating a glass feeder comprising a member which is adjustable to vary the rate at which glass is delivered by said feeder, a weighing scale, and means for causing said scale to actuate said adjustable member in automatic response to the weight of a glass article which is formed from a mold-discharge delivered by said feeder and which is heavier than a predetermined maximum weight, or lighter than a predetermined minimum weight.

16. Apparatus for regulating a glass feeder comprising a burner adapted to heat the glass before it reaches the feeder outlet, a valve controlling said burner, a weighing scale, means operable by said scale, in automatic response to the weight of an abnormally light article formed from a mold-charge delivered by said feeder, for partially opening said valve, and means for partially closing said valve in response to the weight of an abnormally heavy article.

17. Apparatus for regulating a glass feeder comprising an adjustable valve or gate for determining the effective size of the channel through which the glass flows to the feeder outlet, a weighing scale, means operable by said scale, for partially opening said valve in automatic response to the weight of an abnormally light article formed from a mold-charge delivered by said feeder, and means for partially closing said valve in response to the weight of an abnormally heavy article formed from a mold-charge delivered by said feeder.

18. Apparatus for regulating a glass feeder comprising a burner adapted to heat the glass before it reaches the feeder outlet, a valve for controlling said burner, a valve or gate for determining the effective size of the channel through which the glass flows to the feeder outlet, a weighing scale, and means, operable by said scale, for partially opening said valve in successive increments in automatic response to the weight of abnormally heavy test-articles formed from mold-charges delivered by said feeder, and means for thereafter partially opening said glass valve if the successive increases in heat produced by so opening said burner valve are not sufficient to restore said articles to normal weight.

19. Apparatus for regulating a glass feeder comprising a weighing scale, an oscillable member associated with said scale, electric contact members disposed on opposite side of said oscillable member, means for controlling the rate at which glass is delivered by said feeder, electrically operable means for actuating said control means, and electric circuit connections including said contact members and said actuating means, said circuit connections being so arranged that said actuating means are operated whenever said oscillable member engages one of said contact members.

20. Apparatus for regulating a glass feeder comprising a weighing scale, an oscillable member associated with said scale and arranged to move in response to movement of said scale, adjustable electric contact members disposed on opposite side of said oscillating member, means for varying the rate at which glass is delivered by said feeder, electro-magnets for actuating said varying means, and electric circuit connections for energizing said electro-magnets in response to contact of said oscillable member with one of said contact members.

21. Apparatus for regulating a glass feeder comprising a rotatable member adapted to vary the rate at which glass is delivered by said feeder, a worm wheel carried by said rotatable member, a worm in driving engagement with said worm wheel, ratchet wheels for turning said worm in opposite directions, an electro-magnet associated with each of said ratchet wheels, and pawls operated by said electro-magnet and adapted to engage and turn said ratchet wheels.

22. Apparatus for regulating a glass feeder comprising a plurality of rotatable members, each adapted to vary the rate at which glass is delivered by said feeder, a worm wheel carried by each of said rotatable members, two electro-magnets associated with each of said worm wheels and adapted to rotate said worm wheels in opposite directions and in successive increments, an electric contact member carried by one of said worm wheels, fixed contact members arranged in the path of said contact member and on opposite sides thereof, said fixed contact members being connected to the electro-magnets associated with the other worm wheel, and electric circuit connections for actuating the electro-magnets associated with said first named worm wheel until the said contact member carried by said worm wheel engages one of said fixed contact members, and other circuit connections for thereafter energizing the electro-magnets associated with said second-named worm wheel.

23. Apparatus for regulating a glass feeder comprising a plurality of rotatable members, each adapted to vary the rate at which glass is delivered by said feeder, a worm wheel carried by each of said rotatable members, two electro-magnets associated with each of said worm wheels and adapted to rotate said worm wheels in opposite directions and in successive increments, an electric contact member carried by one of said worm wheels, fixed contact members arranged in the path of said contact member and on opposite sides thereof, said fixed contact members being connected to the electro-magnets associated with the other worm wheel, and electric circuit connections for actuating the electro-magnets associated with first-named worm wheel until the said contact member carried by said worm wheel engages one of said fixed contact members, other circuit connections for thereafter energizing the electro-magnets associated with said second-named worm wheel, and a weighing scale, and means associated with said scale for actuating said circuit connections, in response to variations from predetermined limits of weight of articles weighed on said scale.

24. The combination of glass molding mechanism comprising a plurality of molds, means for passing molten glass into said molds, means for maintaining substantially constant the rate of flow of the glass into said molds, said maintaining means comprising a valve, mechanism for controlling said valve, and electrical mechanism for operating said controlling means.

25. In glass forming mechanism, means for feeding glass and means for controlling the rate of flow of said glass, said means comprising a pair of solenoids, cores for said solenoids rigidly connected, means for alternately energizing said solenoids depending upon the rate of flow of said glass, and means operatively connecting said cores with the means for controlling the rate of flow.

In testimony whereof I, the said GEORGE E. HOWARD, have hereunto set my hand.

GEORGE E. HOWARD.

prising a valve, mechanism for controlling said valve, and electrical mechanism for operating said controlling means.

25. In glass forming mechanism, means for feeding glass and means for controlling the rate of flow of said glass, said means comprising a pair of solenoids, cores for said solenoids rigidly connected, means for alternately energizing said solenoids depending upon the rate of flow of said glass, and means operatively connecting said cores with the means for controlling the rate of flow.

In testimony whereof I, the said GEORGE E. HOWARD, have hereunto set my hand.

GEORGE E. HOWARD.

CERTIFICATE OF CORRECTION.

Patent No. 1,619,729.                        Granted March 1, 1927, to

GEORGE E. HOWARD.

It is hereby certified that the above numbered patent was erroneously issued to the inventor, said Howard, whereas said Letters Patent should have been issued to Hartford-Empire Company, of Hartford, Connecticut, a corporation of Delaware, said corporation being assignee of the entire interest in said invention, as shown by the records of assignments in this office; in the printed specification, page 7, line 80, for the word "regulator" read "regulators"; same page, lines 115 and 127, claims 3 and 4 respectively, for the word "of" read "if"; and that the said Letters Patent should be read with these corrections therein that the same may conform to the record of the case in the Patent Office.

Signed and sealed this 5th day of April, A. D. 1927.

Seal.                                                                   M. J. Moore,
Acting Commissioner of Patents.

CERTIFICATE OF CORRECTION.

Patent No. 1,619,729. Granted March 1, 1927, to

GEORGE E. HOWARD.

It is hereby certified that the above numbered patent was erroneously issued to the inventor, said Howard, whereas said Letters Patent should have been issued to Hartford-Empire Company, of Hartford, Connecticut, a corporation of Delaware, said corporation being assignee of the entire interest in said invention, as shown by the records of assignments in this office; in the printed specification, page 7, line 80, for the word "regulator" read "regulators"; same page, lines 115 and 127, claims 3 and 4 respectively, for the word "of" read "if"; and that the said Letters Patent should be read with these corrections therein that the same may conform to the record of the case in the Patent Office.

Signed and sealed this 5th day of April, A. D. 1927.

Seal.

M. J. Moore,
Acting Commissioner of Patents.